United States Patent
Amulu et al.

(10) Patent No.: US 8,484,255 B2
(45) Date of Patent: Jul. 9, 2013

(54) AUTOMATIC CONVERSION OF MULTIDIMENTIONAL SCHEMA ENTITIES

(75) Inventors: James Michael Amulu, Karnataka (IN); Praneeth Chennuru, Andhra Pradesh (IN); Anirban Dey, West Bengal (IN); Lalitendu Samantray, Orissa (IN)

(73) Assignee: SAP AG, Walldorf (DE)

( * ) Notice: Subject to any disclaimer, the term of this patent is extended or adjusted under 35 U.S.C. 154(b) by 235 days.

(21) Appl. No.: 12/959,381

(22) Filed: Dec. 3, 2010

(65) Prior Publication Data

US 2012/0143831 A1 Jun. 7, 2012

(51) Int. Cl.
*G06F 17/30* (2006.01)

(52) U.S. Cl.
USPC .......................................... 707/809

(58) Field of Classification Search
CPC ............................... G06F 8/61; G06K 17/0022
USPC ........................... 707/602, 804–809
See application file for complete search history.

(56) References Cited

U.S. PATENT DOCUMENTS

| | | | |
|---|---|---|---|
| 6,604,110 B1 * | 8/2003 | Savage et al. | 707/602 |
| 7,185,016 B1 * | 2/2007 | Rasmussen | 1/1 |
| 7,596,573 B2 * | 9/2009 | O'Neil et al. | 1/1 |
| 7,664,777 B2 * | 2/2010 | Cras et al. | 707/600 |
| 7,681,185 B2 * | 3/2010 | Kapoor et al. | 717/140 |
| 7,720,804 B2 * | 5/2010 | Fazal et al. | 707/601 |
| 7,774,301 B2 * | 8/2010 | Johnson et al. | 707/602 |
| 7,779,017 B2 * | 8/2010 | Haselden et al. | 707/756 |
| 7,849,048 B2 * | 12/2010 | Langseth et al. | 707/602 |
| 8,037,408 B2 * | 10/2011 | Hartmann | 715/237 |
| 2002/0138316 A1 * | 9/2002 | Katz et al. | 705/7 |
| 2005/0131970 A1 * | 6/2005 | Salazar et al. | 707/205 |
| 2005/0222931 A1 * | 10/2005 | Mamou et al. | 705/35 |
| 2005/0223395 A1 * | 10/2005 | Maeta et al. | 719/331 |
| 2005/0251533 A1 * | 11/2005 | Harken et al. | 707/104.1 |
| 2006/0190835 A1 * | 8/2006 | Cunningham et al. | 715/770 |
| 2007/0083850 A1 * | 4/2007 | Kapoor et al. | 717/106 |
| 2008/0059443 A1 * | 3/2008 | Le Cam et al. | 707/4 |
| 2008/0092112 A1 * | 4/2008 | Jin et al. | 717/106 |
| 2008/0154927 A1 * | 6/2008 | Johnson et al. | 707/101 |
| 2008/0320012 A1 * | 12/2008 | Loving et al. | 707/100 |
| 2009/0012983 A1 * | 1/2009 | Senneville et al. | 707/101 |
| 2011/0161333 A1 * | 6/2011 | Langseth et al. | 707/755 |
| 2011/0295865 A1 * | 12/2011 | Carroll et al. | 707/756 |
| 2012/0102053 A1 * | 4/2012 | Barrett et al. | 707/754 |

* cited by examiner

Primary Examiner — Jorge A Casanova

(57) ABSTRACT

In various embodiments, a system receives a multidimensional schema entity of a first type and converts the multidimensional schema entity to a second type. The system receives user input and converts the multidimensional schema entity to the second type based on the input received from the user. In various embodiments, the system creates multidimensional schema entities automatically. In various embodiments, a method for converting multidimensional schema entities from one or more types to one or more other types is described. In various embodiments, a first multidimensional schema entity is analyzed and converted to a different type based on the analysis. In various embodiments, a multidimensional schema entity is created automatically based on input from two other multidimensional schema entities. In various embodiments, two multidimensional schema entities are merged in one multidimensional schema entity.

12 Claims, 10 Drawing Sheets

AUTOMATIC CONVERSION OF MULTIDIMENTIONAL SCHEMA ENTITIES

TECHNICAL FIELD

The field relates generally to business intelligence applications, and more specifically, to converting multidimensional schema entities from one type to another.

BACKGROUND

When conducting business activities, companies create and process data. Such data can be used as a basis for making decisions. Business Intelligence (BI) collates and prepares enterprise data. By analyzing the data using BI tools, insights that support a decision-making process within a company may be obtained. Among other things, BI enables the creation of reports about business processes and their results and analysis and interpretation data about customers, suppliers, internal activities, and others.

In business software systems, information is often modeled using multidimensional objects that store one or more dimensions of one or more types of information. Such multidimensional objects may be classified in one or more types according to one or more characteristics or parameters the objects possess.

SUMMARY

Various embodiments of systems and methods for automatic conversion of multidimensional schema entities are described herein.

In various embodiments, a system is presented. In various embodiments, the system may be implemented to automatically create, merge, or convert multidimensional schema entities.

In various embodiments, a system of the embodiments may receive data from one or more data sources via one or more source objects and extract, load, and manipulate such data via data transfer processes and transformations.

In various embodiments, a method is presented. The method may include metadata processing to convert multidimensional schema entities (multi-providers) from one type to another type, to create multi-providers, and to merge one or more objects to a target object.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
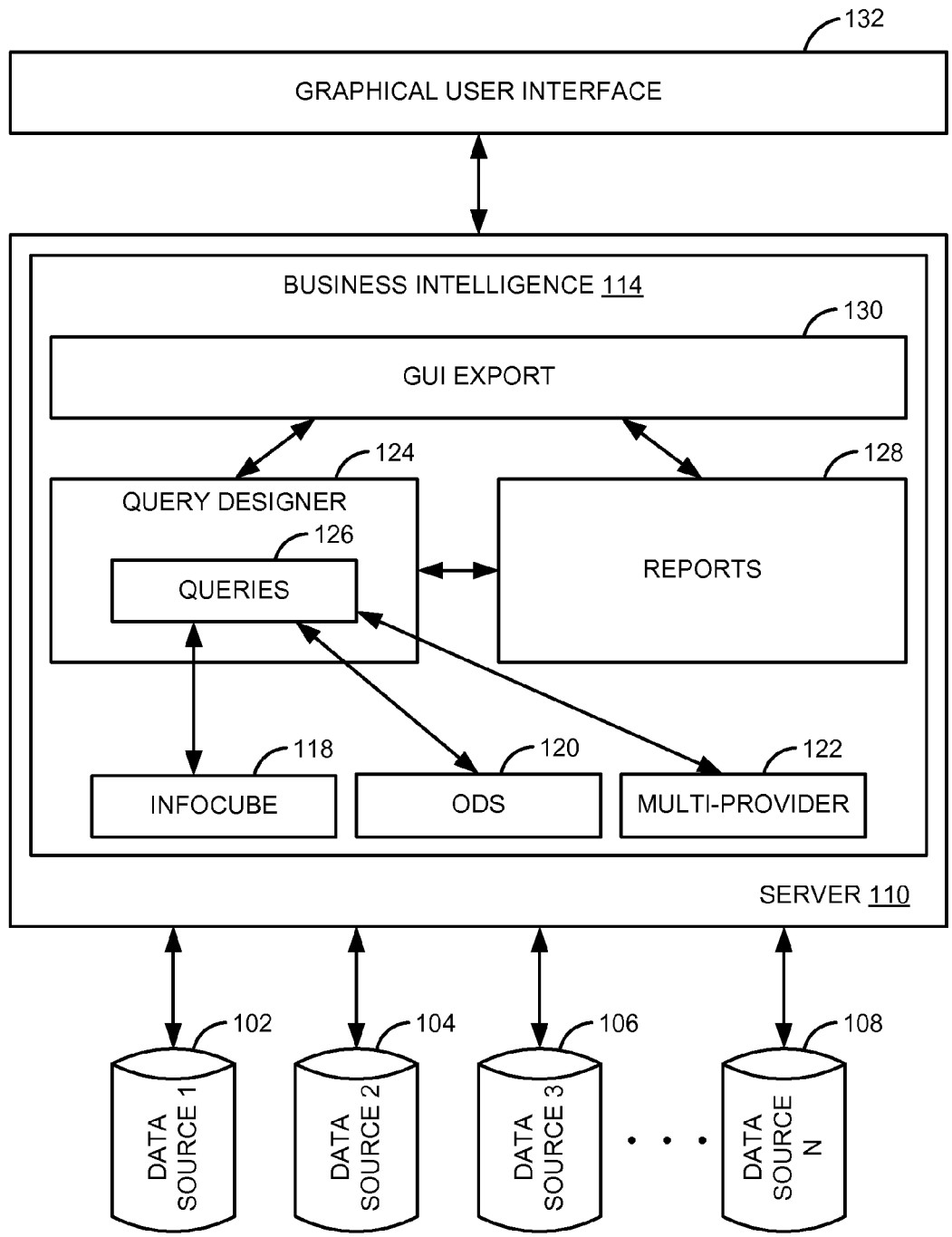
FIG. 1 is a block diagram of a system for automatic conversion, merge, and creation of information providers according to various embodiments.

Embodiments of techniques for automatic conversion of multidimensional schema entities are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. For example, reference to vertical or horizontal direction herein can be seen as a convention and changed when practicing the invention. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, Business Intelligence (BI) may refer to a category of software systems and applications used to improve business enterprise decision-making and governance. Such software tools provide techniques for analyzing and leveraging enterprise applications and data. These tools are commonly applied to financial, human resource, marketing, sales, service provision, customer and supplier analyses, and others. More specifically, these tools may include: reporting and analysis tools to analyze, forecast and present information, content delivery infrastructure systems for delivery, storage and management of reports and analytics, data warehousing systems for cleansing and consolidating information from disparate sources, and integration tools to analyze and generate workflows based on enterprise systems. Business Intelligence tools work with data management systems, such as relational databases or On Line Analytic Processing (OLAP) systems used to collect, store, and manage raw data and transactional enterprise systems that generate data.

In various embodiments, a data source is an information resource. Data sources include sources of data that enable data storage and retrieval. Data sources may include databases, such as, relational, transactional, hierarchical, multi-dimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

In various embodiments, business intelligence applications model complex data sets in multiple dimensions. A star schema (also referred to as "dimensional model") is a collection of data sets where one data set may be a fact table of business data and the fact table may be related to multiple data sets representing numeric facts across one or more dimensions. For example, a star schema may include business data related to customers, products, sales, regions, and others. Sales data may thus be described in relation to products and customers across the dimension of time. Using star schemas, multidimensional tables may be created in a relational database.

A dimension is a line in a real or abstract space. An example of a real space dimension is a pair of anti-parallel cardinal points on a compass, e.g., North and South, North-northwest and South-southeast. Another real dimension is time. An example of an abstract space dimension is a list of stores. The dimension is abstract because the list can be ordered alphabetically by name, by store number, by distance from head office, etc. Examples of dimensions include region, store, year, customer, employee, product line, and the like.

In various embodiments, a dimension object models a set of business entities of a common nature such as a geographical location, a product or group of products, and a time period, that are used to structure an analysis. Dimension objects can have properties (e.g., attributes or details) attached to them. For instance, a Customer could have an address. Dimension objects can be structured into OLAP hierarchies. For instance, Countries contain States, which contain Cities. When a dimension object is directly used in a report, what appears is not the business entity, but an attribute, such as a unique name or caption, designed to be user-friendly.

In various embodiments, business intelligence objects that store physical data may be referred to as "information providers." Such information providers may be of one or more types, for example, info cubes, data store objects (DSO), and information objects (hereinafter also referred to as "info objects").

In various embodiments, an information object is a collection of one or more pieces of metadata. The metadata describes one or more aspects of a component in a system. Information objects may be implemented in binary or human readable format. In various embodiments, the information objects may be implemented in eXtensible Markup Language (XML).

In various embodiments, an info cube may be a collection of information objects and each information object may store relational business data. Info cubes may be filled with data from one or more data sources. An info cube describes a self-contained dataset (from the reporting view), for example, for a business-oriented area. An info cube is a set of relational tables that are created in accordance with a star schema: a large fact table in the center, with several dimension tables surrounding it.

In various embodiments, an operational data store integrates data from different data sources for reporting purposes. In an information technology landscape, many different data sources may exist such as databases, legacy systems, and others.

In various embodiments, a data transfer process ("DTP") specifies how data may be transferred from a source object to a target object in a BI system. For example, a DTP may specify a source object as a source to obtain data from, a target object to load data in, and one or more rules to transform the data if the source object and the target object have different structures.

In various embodiments, a transformation is a way to consolidate, cleanse, and integrate data. A transformation may include one or more rules specifying how data may be transformed from a source object to a target object along a data flow.

FIG. 1 is a block diagram of a system for automatic conversion, merge, and creation of information providers according to various embodiments. Referring to FIG. 1, a business software system includes a server 110. A business intelligence application 114 runs on the server 110. The business intelligence application 114 receives data from data sources 1 through n at blocks 102 through to 108. Such data is loaded in one or more objects such as info cube 118, operational data store (ODS) 120, and multi-provider 122. The business intelligence application 114 also includes a query designer module 124. Via the query designer 124 queries 126 are created. The purpose of the queries 126 is to create a logical model of a report and load data for such a report from one or more of the info cube 118, ODS 120, and multi-provider 122. When one or more queries 126 are run, one or more reports 128 are created. Further, reports 128 may be processed to manipulate their graphical representation, and via the GUI export module 130, they may be presented to users on the graphical user interface 132. Using the reports 128 in the GUI 132, employees of a company may collect and analyze data about the business activities of the company. Further, reports 128 may facilitate business decision making.

Info cube 118, ODS 120, and multi-provider 122 may be referred to as "information providers," collectively. Each type of information provider has their own structure, semantics, and data management procedures. Thus, if an information provider has to be merged with another information provider, or transformed from one type to another type, a lot of effort may be required to analyze the input and output information providers and apply data transformations.

Figure 2:
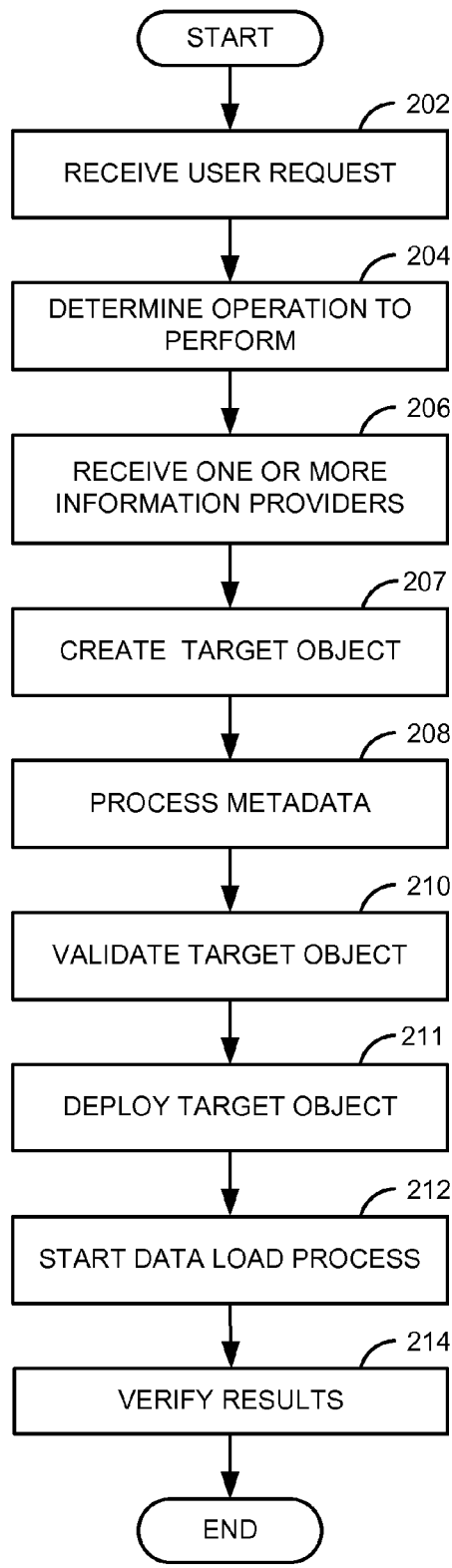
FIG. 2 is a flow diagram of a method for automatic conversion, merge, and creation of information providers according to various embodiments.

FIG. 2 is a flow diagram of a method for automatic conversion, merge, and creation of information providers according to various embodiments. Referring to FIG. 2, at process block 202, a user request is received. The user request may be received via a GUI such as the GUI 132 of FIG. 1. A user may wish to convert one type of information provider to another, create a new information provider, or merge two information providers. Thus, at process block 204, the operation to be performed is determined. At process block 206, one or more information providers are received as necessary per the operation determined to be performed at process block 204. These information providers necessary for the operation to be performed are called source information providers. For example, if the operation to be performed is a merge, two source information providers may be received. In another example, if the operation determined to be performed is a convert, one source information provider may be received.

At process block 207 a target object with a default structure is created. This target object is also called target info cube or target information provider.

At process block 208, metadata per the operation is processed. Metadata processing may involve analyzing metadata in a source information provider (i.e. source object) and reorganizing the structure of such metadata to fit a target information provider (i.e. target object). Metadata processing may involve classifying metadata elements based on type of metadata. In one embodiment, the source information provider metadata elements are classified as follows: all character elements as characteristics; numeric elements as measures; date element as date; and unit elements as unit of measure (UOM). Upon classification, the source metadata elements are associated to the newly created target info cube (target object). In one embodiment, the metadata elements are allowed to be modified and rearranged by the users. Further, metadata processing may involve creating one or more data transformation processes to specify how data should be loaded in a source object or loaded from a source object to a target object. In one embodiment, transformation and mappings are created between the source information provider and the newly created target info cube (target object).

At process block 210, the target object is validated. Such validation may include, for example, validating that a newly created target object has a structure to fit data loaded from a source object. In another example, such validation may include checks to determine if the data that is to be loaded may fit into the target object structure or if modifications are required. At process block 211, the target object is deployed on the system. Then, at block 212, the data load process into the target object starts. The data load process strictly follows data integrity aspects of the data during conversion. At process block 214, the results of the operation are verified.

The method for automatic conversion as described in FIG. 2 is a single click operation. The conversion is fully automated process. No preliminary work is involved in understanding the source information providers and transforming them in the best way to the target info cube as one-click conversion. The conversion uses best case default logic. During the conversion, information is maintained about the data transfer process, the transformation, and its mappings to the source information providers. The existing data in the source information providers is available in the target info cube in its integrity. The one-click conversion is a complete process of transformation of existing information providers to a target info cube. The target info cube is created with no user intervention. User verification and modification is allowed only if required.

Figure 3:
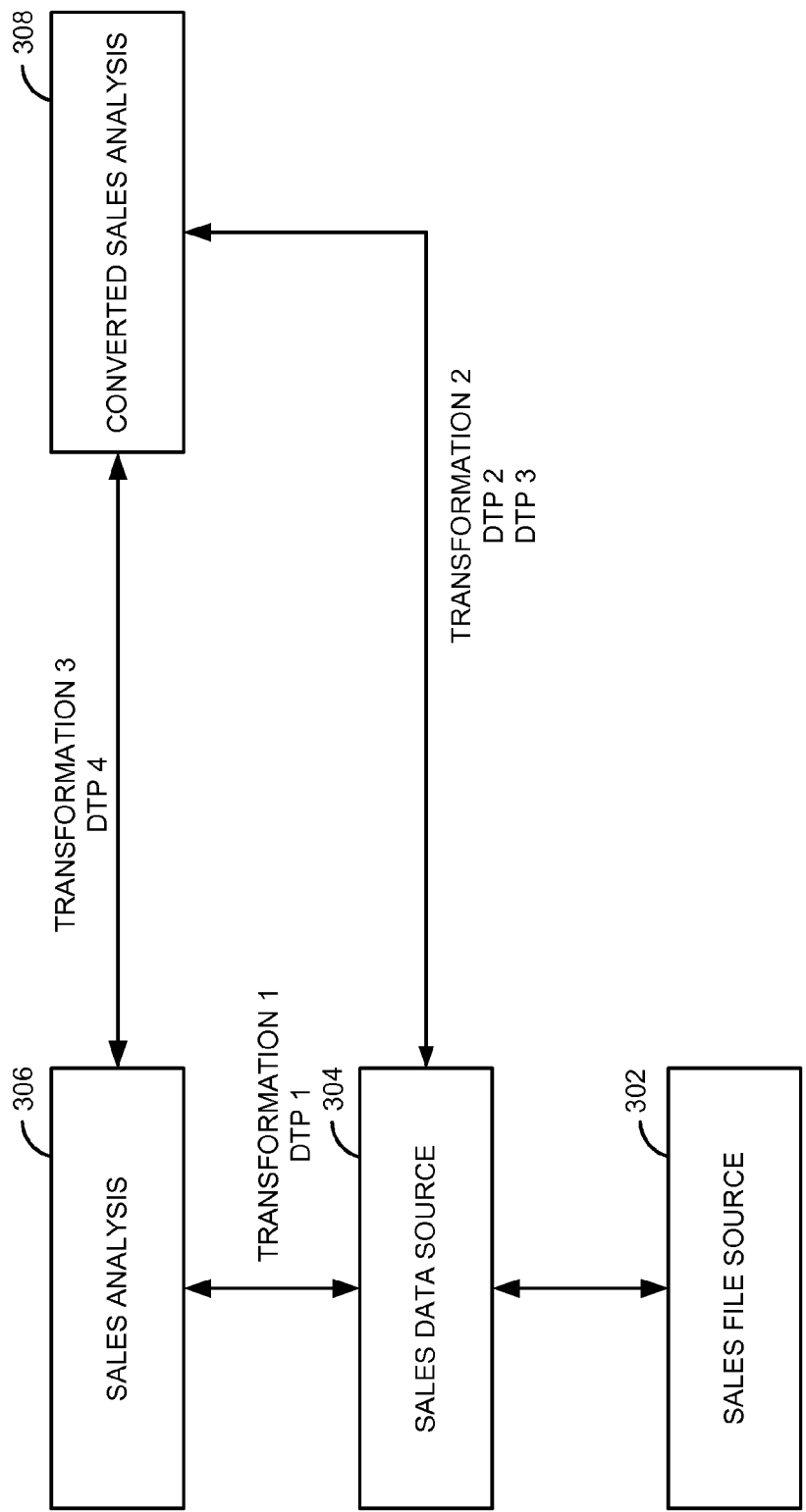
FIG. 3 is a block diagram of an exemplary conversion of a source sales analysis object to a target sales analysis object according to various embodiments.

FIG. 3 is a block diagram of an exemplary conversion of a source sales analysis object to a target sales analysis object according to various embodiments. Referring to FIG. 3, data is loaded from a sales source file 302 to a sales data source 304. From the sales data source 304 a source sales analysis object 306 is created via transformation 1 and DTP 1. Via transformation 2 and DTP 2, a converted sales analysis object 308 is created. Further, via transformation 3 and DTP 3 and DTP 4 the member elements of converted sales analysis 308 are converted to the structure of converted sales analysis 308 and the data in sales data source 304 is loaded in converted sales analysis 308, thus completing the conversion process.

Figure 4:
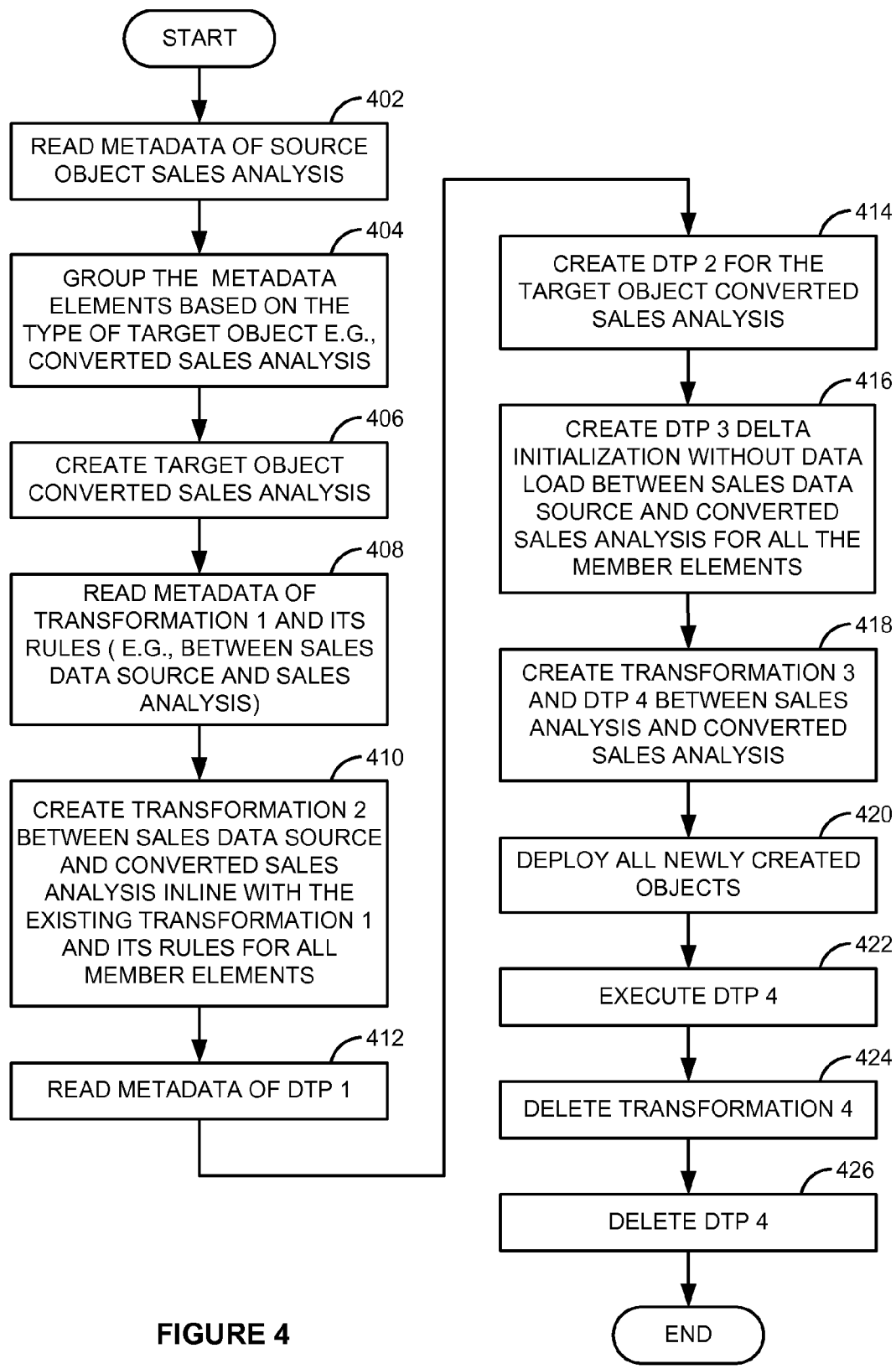
FIG. 4 is a flow diagram of an exemplary method for metadata processing in a method for converting the source object of FIG. 3 to the target object of FIG. 3 according to various embodiments.

FIG. 4 is a flow diagram of an exemplary method for metadata processing in a method for converting the source object of FIG. 3 to the target object of FIG. 3 according to various embodiments. Referring to FIG. 4, at block 402, the metadata of the source object sales analysis (e.g., source object sales analysis 306 in FIG. 3) is read. At block 404, metadata elements are grouped based on the type of object of the target object, (e.g converted sales analysis 308). At block 406, the target object converted sales analysis (e.g converted sales analysis 308) is created. At block 408, the metadata of transformation 1 and the rules included therein are read, (e.g. between sales data store 304 and sales analysis 306). At block 410, transformation 2 is created between sales data source 304 and converted sales analysis 308 according to the rules in existing transformation 2 and its rules for all member elements. At block 412, metadata of DTP 1 is read. At block 414, DTP 2 is created for all member elements of the target object converted sales analysis 308. At block 416, DTP 3 delta initialization without data load between sales data source 304 and converted sales analysis 308 for all the member elements is created. A delta initialization means that only data which has been changed will be initialized. Further, if the no data load option is used, no data will be loaded at that time. At block 418, transformation 3 and DTP 4 between sales analysis 306 and converted sales analysis 308 are created. At block 420, all newly created objects are deployed. At block 422, DTP 4 is executed. At block 424, transformation 4 is deleted. At block 426, DTP 4 is deleted.

Figure 5:
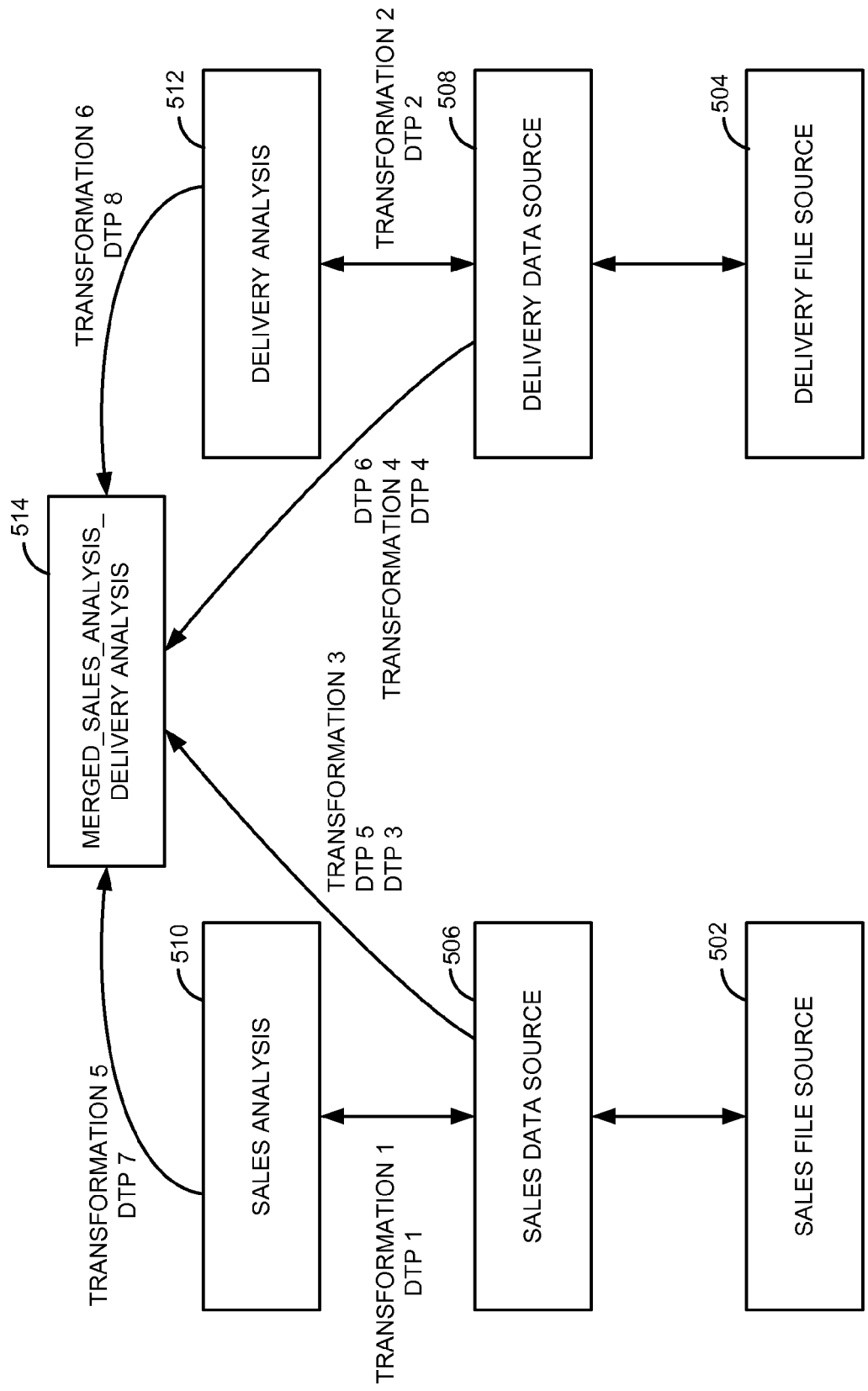
FIG. 5 is a block diagram of an exemplary merge of a sales analysis object and a delivery analysis object according to various embodiments.

FIG. 5 is a block diagram of an exemplary merge of a sales analysis object and a delivery analysis object according to various embodiments. Referring to FIG. 5, a sales file source 502 stores data for a sales data source 506. A delivery file source 504 stores data for a delivery data source 508. A sales analysis object 510 loads data from the sales data source 506 based on DTP 1 and transformation 1. A delivery analysis object 512 loads data from the delivery data source 508 based on DTP 2 and transformation 2. A merged object 514 is created to hold the merged data of the two source objects. The elements of the sales analysis object 510 and the delivery analysis object 512 are loaded to the merged object 514 via the DTP 7 and 8 and transformation 5 and 6. Further one or more transformations and DTPs are created to ensure the data from the sales data source 506 and delivery data source 508 are loaded properly to the merged object 514 (e.g., transformation 3 and 4 and DTP 3-6).

Figure 6A:
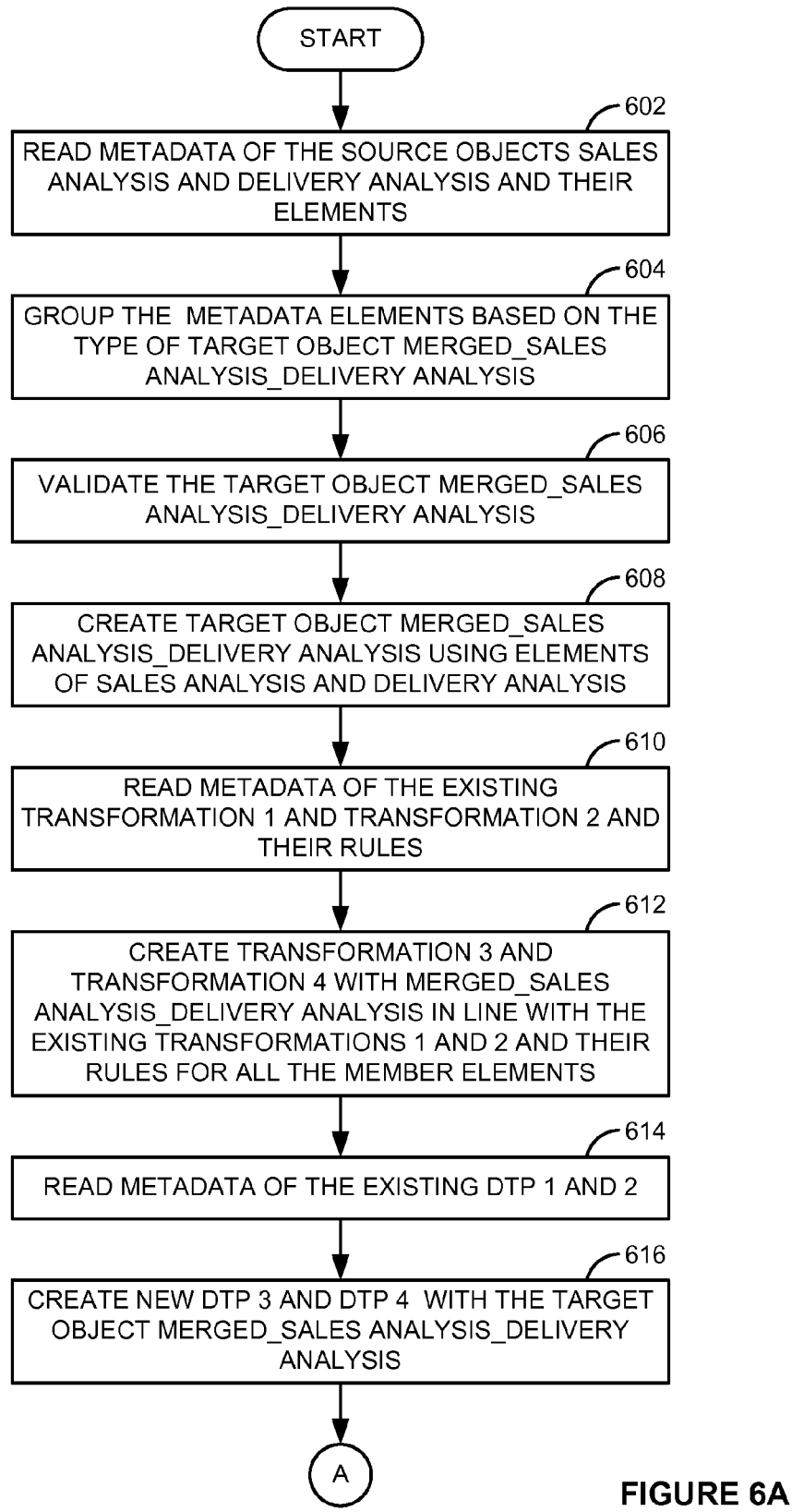
FIG. 6A is a flow diagram of the metadata processing of a first part of an exemplary method for merging the sales analysis object and the delivery analysis object of FIG. 5 according to various embodiments.

FIG. 6A is a flow diagram of the metadata processing of a first part of an exemplary method for merging the sales analysis object and the delivery analysis object of FIG. 5 according to various embodiments. Referring to FIG. 6A, at block 602, metadata of the source objects sales analysis and delivery analysis and their elements is read. At block 604, the read metadata elements are grouped based on the type of target object. At block 606, the target object is validated. At block 608, the target object is created using elements of the source objects. At block 610, metadata of transformation 1 and 2 are read. At block 612 transformation 3 and transformation 4 are created in line with transformations 1 and 2 for all elements of the target object. At block 614, metadata of DTP 1 and 2 is read. At block 616, DTP 3 and 4 are created for the target object.

Figure 6B:
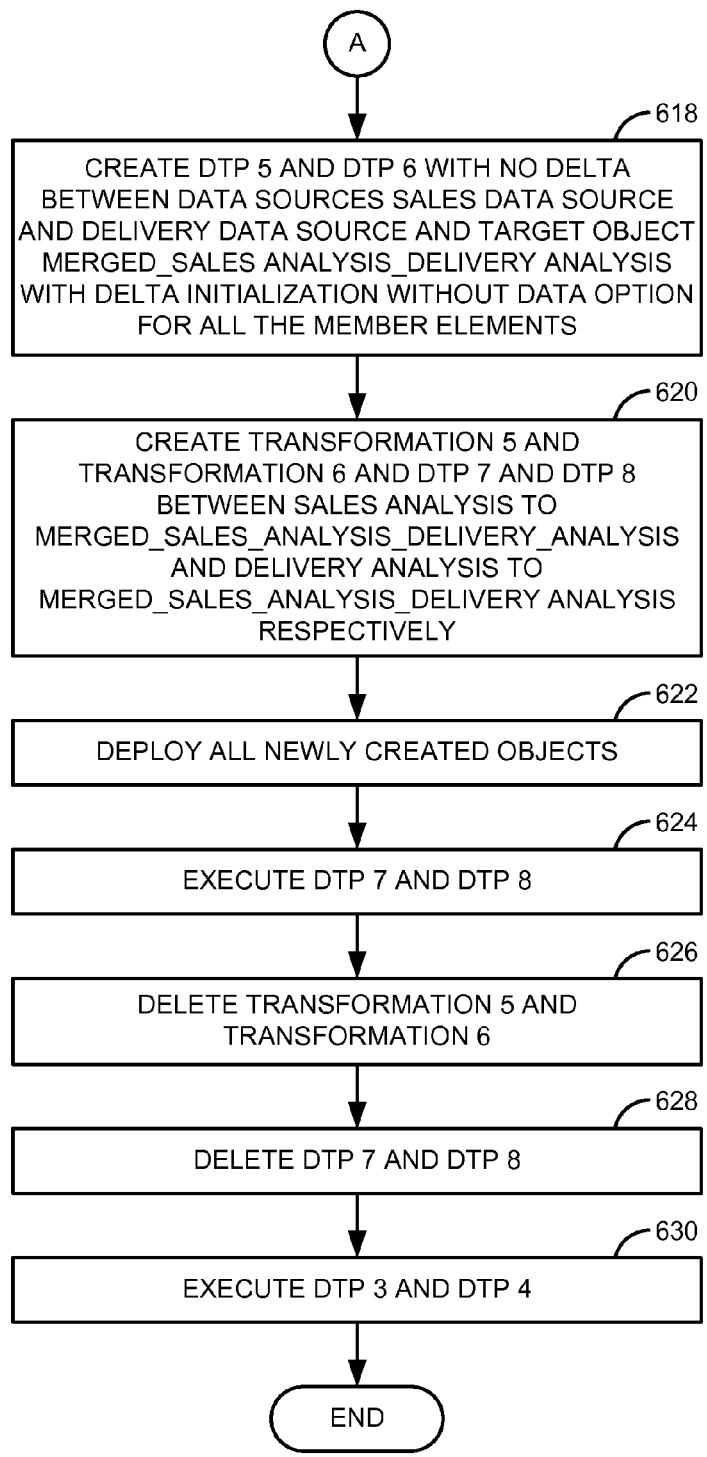
FIG. 6B is a flow diagram of a second part of the metadata processing of an exemplary method for merging the sales analysis object and the delivery analysis object of FIG. 5 according to various embodiments.

FIG. 6B is a flow diagram of a second part of the metadata processing of an exemplary method for merging the sales analysis object and the delivery analysis object of FIG. 5 according to various embodiments. Referring to FIG. 6B, at block 618 DTP 5 between sales data source and the target object and DTP 6 between delivery data source and the target object are created. At block 620, transformation 5 and DTP 7 between sales analysis and the target object and transformation 6 and DTP 8 between delivery analysis and the target object are created. At block 622, created objects are deployed.

At block 624, DTP 7 and 8 are executed. At block 626, transformation 5 and transformation 6 are deleted. At block 628 DTP 7 and DTP 8 are deleted. At block 630, DTP 3 and 4 are executed.

Figure 7:
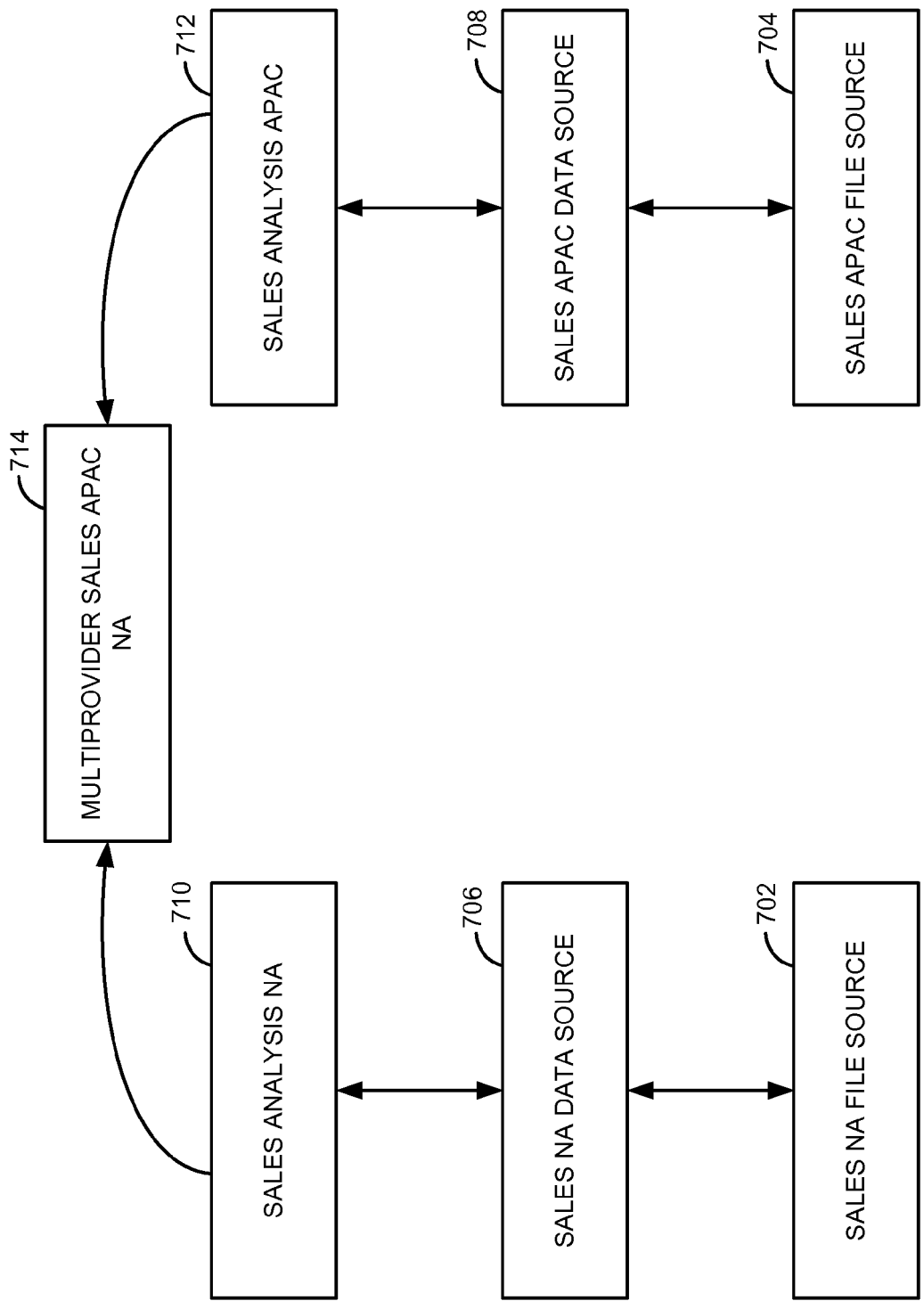
FIG. 7 is a block diagram of an exemplary automatic creation of a multi-provider combining data for North America ("NA") region and Asia Pacific region ("APAC") according to various embodiments.

FIG. 7 is a block diagram of an exemplary automatic creation of a multi provider combining data for North America ("NA") region and Asia Pacific region ("APAC") according to various embodiments. Referring to FIG. 7, a sales NA data source 706 loads data from a sales NA file source 702. A sales APAC data source 708 loads data from a sales APAC file source 704. A multi provider sales analysis APAC NA 714 is automatically created based on two source objects, e.g., sales analysis NA 710, and sales analysis APAC 712.

Figure 8:
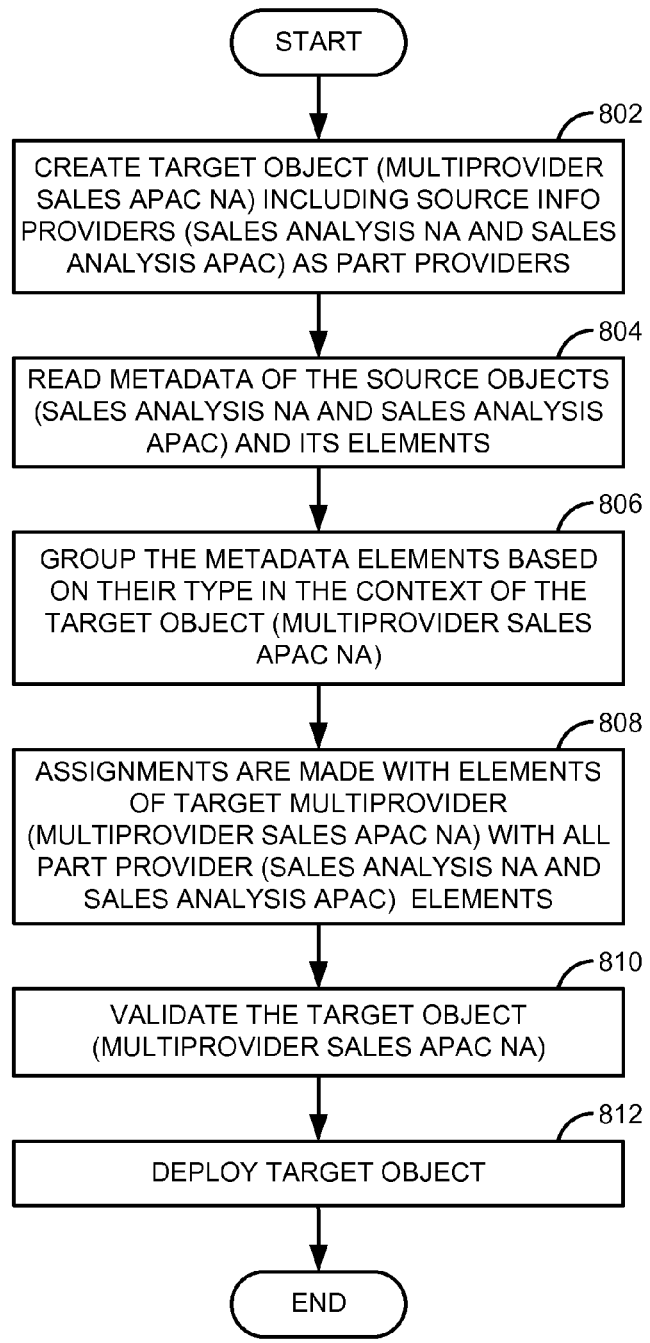
FIG. 8 is a flow diagram of the metadata processing of an exemplary method for automatically creating the sales analysis NA APAC multi-provider of FIG. 7 according to various embodiments.
Figure 9:
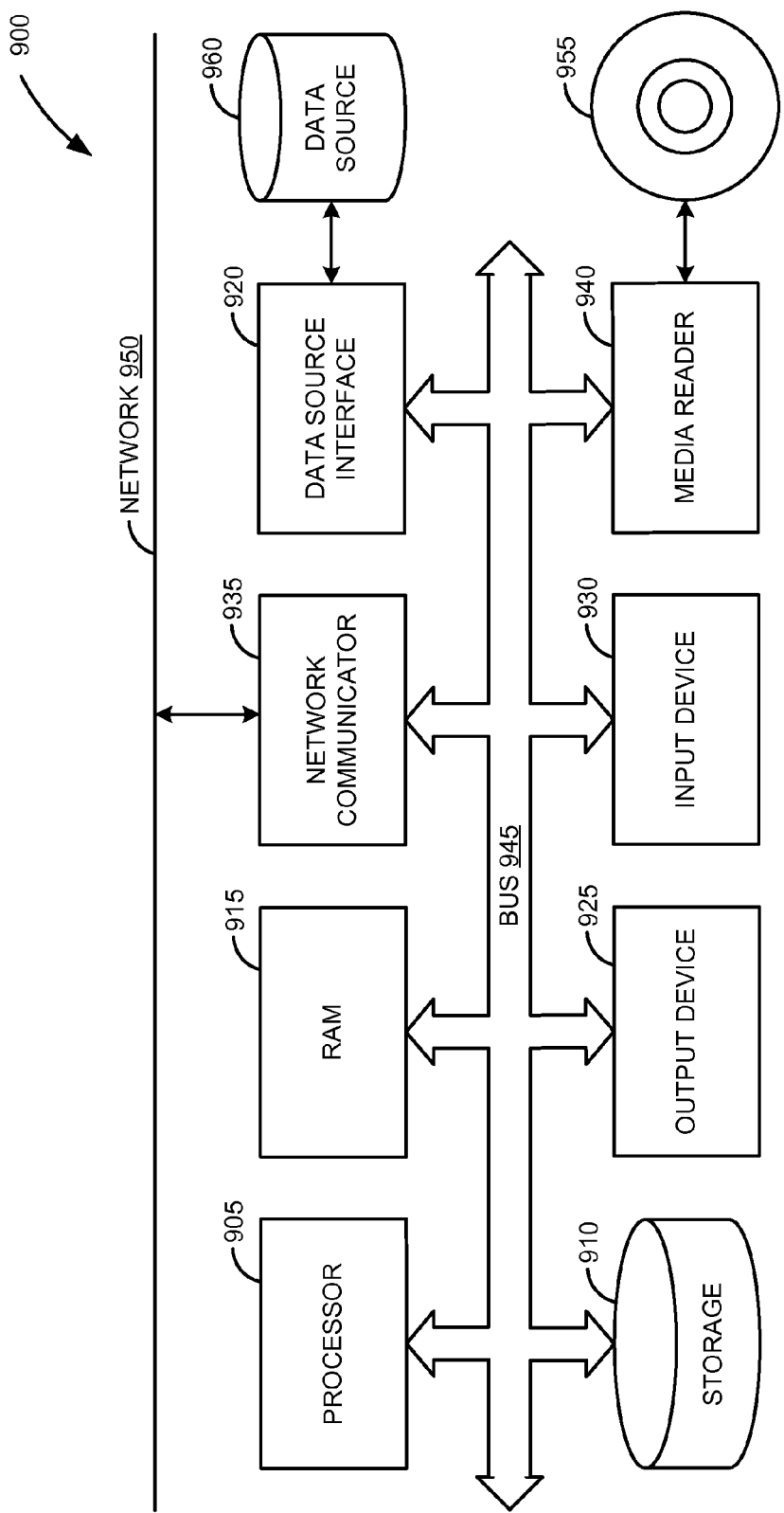
FIG. 9 is a block diagram of a system according to various embodiments.

FIG. 8 is a flow diagram of the metadata processing of an exemplary method for automatically creating the sales analysis NA APAC multi provider of FIG. 7 according to various embodiments. Referring to FIG. 8, at block 802, the target object sales analysis APAC NA is created. At block 804, metadata of the source objects is read. At block 806, metadata elements are grouped based on their type in the context of the target object. At block 808, metadata elements are assigned to elements of the target object. At block 810, the target object is validated. At block 812, the created target object is deployed.

The methods as described in FIGS. 2, 4, 6A, 6B, and 8 have a number of advantages. For example, human effort is not needed to understand the existing info cube and how to translate the info cube to a DSO, or to merge info cubes. Further, human intervention is not needed to maintain information about a current DTP, a current transformation, and their replication to a newly created DSO after the conversion.

Also, the method as described in FIGS. 2, 4, 6A, 6B, and 8 ensures that existing data and data flow are available in a newly created (e.g., converted) DSO, thus facilitating data integrity.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

FIG. 4 is a flow diagram of an exemplary method for metadata processing in a method for converting the source object of FIG. 3 to the target object of FIG. 3 according to various embodiments. Referring to FIG. 4, at block 402, the metadata of the source object sales analysis (e.g., source object sales analysis 306 in FIG. 3) is read. At block 404, metadata elements are grouped based on the type of object of the target object, (e.g converted sales analysis 308). At block 406, the target object converted sales analysis (e.g converted sales analysis 308) is created. At block 408, the metadata of transformation 1 and the rules included therein are read, (e.g. between sales data store 304 and sales analysis 306). At block 410, transformation 2 is created between sales data source 304 and converted sales analysis 308 according to the rules in existing transformation 1 and its rules for all member elements. At block 412, metadata of DTP 1 is read. At block 414, DTP 2 is created for all member elements of the target object converted sales analysis 308. At block 416, DTP 3 delta initialization without data load between sales data source 304 and converted sales analysis 308 for all the member elements is created. A delta initialization means that only data which has been changed will be initialized. Further, if the no data load option is used, no data will be loaded at that time. At block 418, transformation 3 and DTP 4 between sales analysis 306 and converted sales analysis 308 are created. At block 420, all newly created objects are deployed. At block 422, DTP 4 is executed. At block 424, transformation 4 is deleted. At block 426, DTP 4 is deleted.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer readable storage medium having computer readable instructions tangibly stored thereon which when executed by the computer, cause the computer to perform automatic conversion of multidimensional schema entities comprising:
   receiving a source object and source object metadata;
   receiving transformation metadata of a first transformation between a data source of the source object and the source object, wherein the first transformation comprises a first set of transformation rules;
   creating a target object for converting the source object by processing the received source object metadata;
   creating a second transformation, corresponding to the first transformation, between the data source of the source object and the target object;
   receiving metadata of a first data transfer process related to the first transformation;
   creating a second data transfer process from the data source for a set of member elements of the target object;
   creating a third data transfer process associated with the second transformation with delta initialization without data load between the data source of the source object and the target object for one or more target object member elements from the set of member elements from the target object, wherein the one or more target object member elements correspond to changed data within the first transformation created between the data source and the source object;
   creating a third transformation and a fourth data transfer process between the source object and the target object for transferring data from the source object to the target object; and
   executing the fourth data transfer process.

2. The computer readable storage medium of claim 1, further comprising instructions for deploying one or more created target objects.

3. The computer readable storage medium of claim 1, further comprising instructions for grouping elements of the source object metadata based on a type of target object.

4. The computer readable storage medium of claim 1, further comprising instructions for deleting the fourth data transfer process.

5. A computer implemented method for merging multidimensional schema entities, comprising:
   receiving a first source object and first source object metadata and a second source object and a second source object metadata;
   receiving transformation metadata of a first transformation between a first data source and the first source object and a second transformation between a second data source and the second source object;
   grouping one or more elements of the first source object metadata and the second source object metadata based on a type of a target object;
   creating the target object using one or more elements of the first source object metadata and the second source object metadata;
   creating one or more data transfer processes between the first data source of the first source object and the target object and between the second data source of the second source object and the target object, wherein the one or more data transfer processes comprise one or more transformations corresponding to the first transformation between the first data source and the first source object and the second transformation between the second data source and the second source object;
   creating one or more data transfer processes between the first source object and the target object and between the second source object and the target object; and
   executing the one or more data transfer processes between the first data source and the target object and between the second data source and the target object; and
   executing the one or more data transfer processes between the first source object and the target object and between the second source object and the target object.

6. The computerized method of claim 5, further comprising validating the target object.

7. The computerized method of claim 5, further comprising deploying one or more target objects.

8. The computerized method of claim 5, wherein creating one or more data transfer processes between the first data source and the target object and between the second data source and the target object comprises:
   creating a fifth data transfer process between the first data source and the target object without data initialization; and
   creating a sixth data transfer process between the second data source and the target object without data initialization.

9. The computerized method of claim 5, further comprising:
   creating a third transformation and a fourth transformation for the target object based on the first transformation metadata and the second transformation metadata for one or more elements of the target object.

10. The computerized method of claim 5, further comprising:
    creating a fifth transformation and a seventh data transfer process between the first source object and the target object; and
    creating a sixth transformation and an eighth data transformation process between the second source object and the target object.

11. The computerized method of claim 10, further comprising:
- deleting the fifth transformation and the sixth transformation; and
- deleting the seventh data transfer process and the eighth data transformation process.

12. A computer system for automatic conversion of multi-dimensional schema entities comprising a processor, the processor communicating with one or more memory devices storing instructions, the instructions comprising:
- a graphical user interface to receive requests for conversion of data source objects of different types;
- a server module to receive one or more data sources; and
- a business intelligence module associated with the server module to:
  - transform a data source from the one or more data sources to a source object according to a first transformation comprising a set of transformation rules;
  - create a target object for converting the source object;
  - create a second transformation, corresponding to the first transformation, between the data source of the source object and the target object;
  - receive metadata of a first data transfer process related to the first transformation;
  - create a second data transfer process from the data source for a set of member elements of the target object;
  - create a third data transfer process associated with the second transformation with delta initialization without data load between the data source of the source object and the target object for one or more target object member elements from the set of member elements from the target object, wherein the one or more target object member elements correspond to changed data within the first transformation created between the data source and the source object;
  - create a third transformation and a fourth data transfer process between the source object and the target object for transferring data from the source object to the target object; and
  - execute the fourth data transfer process.

* * * * *